United States Patent
Sans

Patent Number: 6,161,517
Date of Patent: Dec. 19, 2000

[54] DEVICE FOR CONTROLLING AN INTERNAL COMBUSTION ENGINE WITH CONTROLLED IGNITION AND DIRECT INJECTION

[75] Inventor: Mariano Sans, Blagnac, France

[73] Assignee: Siemens Automotive S.A., Toulouse Cedex, France

[21] Appl. No.: 09/355,088

[22] PCT Filed: Jan. 14, 1998

[86] PCT No.: PCT/EP98/00188

§ 371 Date: Jul. 20, 1999

§ 102(e) Date: Jul. 20, 1999

[87] PCT Pub. No.: WO98/31927

PCT Pub. Date: Jul. 23, 1998

[30] Foreign Application Priority Data

Jan. 20, 1997 [FR] France .................................. 97 00648

[51] Int. Cl.$^7$ ........................... F02D 41/34; F02D 41/14; F02B 17/00

[52] U.S. Cl. ........................................... 123/295; 701/103

[58] Field of Search ..................... 123/295; 701/103–105

[56] References Cited

U.S. PATENT DOCUMENTS

| | | | |
|---|---|---|---|
| 5,889,205 | 3/1999 | Treinies et al. ........................ | 73/118.2 |
| 5,896,840 | 4/1999 | Takahashi ............................... | 123/295 |
| 5,947,079 | 9/1999 | Sivashanker et al. .................. | 123/295 |
| 6,006,717 | 10/1999 | Suzuki et al. .......................... | 123/295 |
| 6,024,069 | 2/2000 | Yoshino ................................ | 123/295 |
| 6,026,779 | 2/2000 | Obata et al. ........................... | 123/295 |
| 6,032,640 | 3/2000 | Evans ..................................... | 123/295 |
| 6,050,238 | 4/2000 | Suzki et al. ............................ | 123/295 |

FOREIGN PATENT DOCUMENTS

| | | |
|---|---|---|
| 0491381A2 | 6/1992 | European Pat. Off. . |
| 0661432A2 | 7/1995 | European Pat. Off. . |
| 2257268 | 1/1993 | United Kingdom . |
| 2 271 198 | 6/1994 | United Kingdom . |
| 96/32579 | 10/1996 | WIPO . |

OTHER PUBLICATIONS

Japanese Patent Abstract No. 06036719 (Hitoshi), dated Feb. 10, 1994.

"Gasoline Direct Injection: Actual Trends and Future Strategies for Injection and Combustion Systems", G.K. Fraidl et al., AVL List GmbH, Graz, Austria, pp. 1–17.

Primary Examiner—Henry C. Yuen
Assistant Examiner—Arnold Castro
Attorney, Agent, or Firm—Herbert L. Lerner; Laurence A. Greenberg; Werner H. Stemer

[57] ABSTRACT

A device for controlling a controlled-ignition direct-injection internal combustion engine to avoid abrupt variations in torque when switching from homogeneous-charge to stratified-charge combustion mode and vice versa, includes a determinator for determining a reference value of a transmission torque as a function of a position of an accelerator pedal. A calculator is provided for calculating a value of at least one command of at least one controller for controlling the engine based on a datum value for a transmission torque. A corrector is configured to correct the datum value of the transmission torque as a function of the engine combustion mode by applying a torque correction taken from a correction table as a function of at least one variable representing a load on the engine. The calculator has a first inverse model of the engine in its homogeneous-charge combustion mode and a second inverse model of the engine in its stratified-charge combustion mode.

11 Claims, 2 Drawing Sheets

DEVICE FOR CONTROLLING AN INTERNAL COMBUSTION ENGINE WITH CONTROLLED IGNITION AND DIRECT INJECTION

BACKGROUND OF THE INVENTION

Field of the Invention

The present invention relates to a device for controlling a controlled-ignition direct-injection internal combustion engine, particularly a high-pressure, direct-injection engine.

According to document DE 42 32 974, a control device for a controlled-ignition internal combustion engine has a device for determining a datum torque. It also comprises a device for determining the throttle valve angle which determines this angle as a function of the datum torque. For this purpose, in the device for determining the throttle valve angle, there is an inverse model of the filling of the inlet tract and of the cylinder of the internal combustion engine and a table of throttle valve opening angles.

In publication SAE 960465 "Gasoline direct injection: Actual trends and future strategies for injection and combustion systems", by G. K. Fraidl, W. F. Piock and M. Wirth, it is proposed that a direct-injection controlled-ignition internal combustion engine be made to run in stratified-charge combustion mode in the lower part load spectrum. For this purpose, an air/fuel ratio greater than 100 is preferably set. In the upper part-load spectrum, it is proposed that the engine be run in homogeneous-charge or in stratified-charge combustion mode, alternately. Thus, a system for the subsequent treatment of the exhaust gases, such as a DeNox catalyst, can be regenerated. In this way, the legally imposed restrictions on emission can be met.

SUMMARY OF THE INVENTION

However, an abrupt variation of the torque on the output shaft of the internal combustion engine may occur during the change from homogeneous-charge combustion mode to stratified-charge combustion mode and vice versa, and this is to the detriment of driving comfort.

The object of the invention is to produce a control device designed to minimize this variation in torque when changing from homogeneous-charge to stratified-charge combustion mode and vice versa.

This object is achieved by means of a device for controlling a controlled-ignition direct-injection internal combustion engine, comprising means of determining a reference value of a transmission torque as a function of the position of an accelerator pedal, means of calculating the value of at least one command of at least one means of controlling the engine on the basis of the datum value for the transmission torque, said calculation means comprising a first inverse model of the engine in its homogeneous-charge combustion mode and a second inverse model of the engine in its stratified-charge combustion mode, and correction means designed to correct the datum value of the transmission torque as a function of the engine combustion mode by applying a torque correction taken from a correction table as a function of at least one variable representing the load on the engine.

DESCRIPTION OF THE PREFERRED EMBODIMENTS

In a preferred embodiment of the invention, the control device has an adaptation device which adapts the torque correction values in the correction table as a function of an internal combustion engine output variable. Thus, the modifications to the effective behavior of the engine which are brought about by manufacturing tolerances or by the aging of the engine, can be compensated for.

In another advantageous embodiment of the invention, the adaptation is performed within a predetermined period of time around a change in combustion mode from homogeneous-charge to stratified-charge or from stratified-charge to homogeneous-charge.

Figure 1:
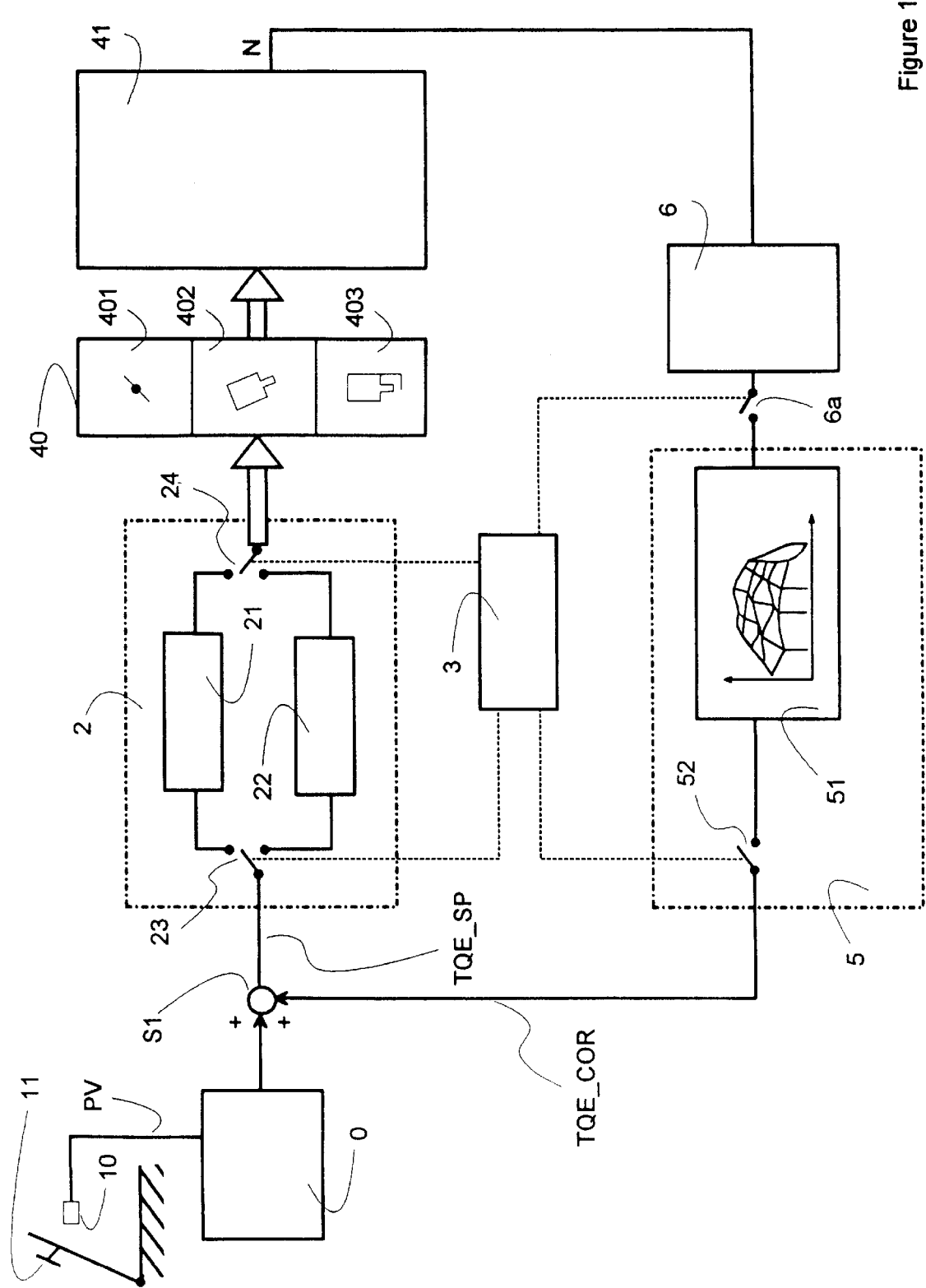
Figure 2:
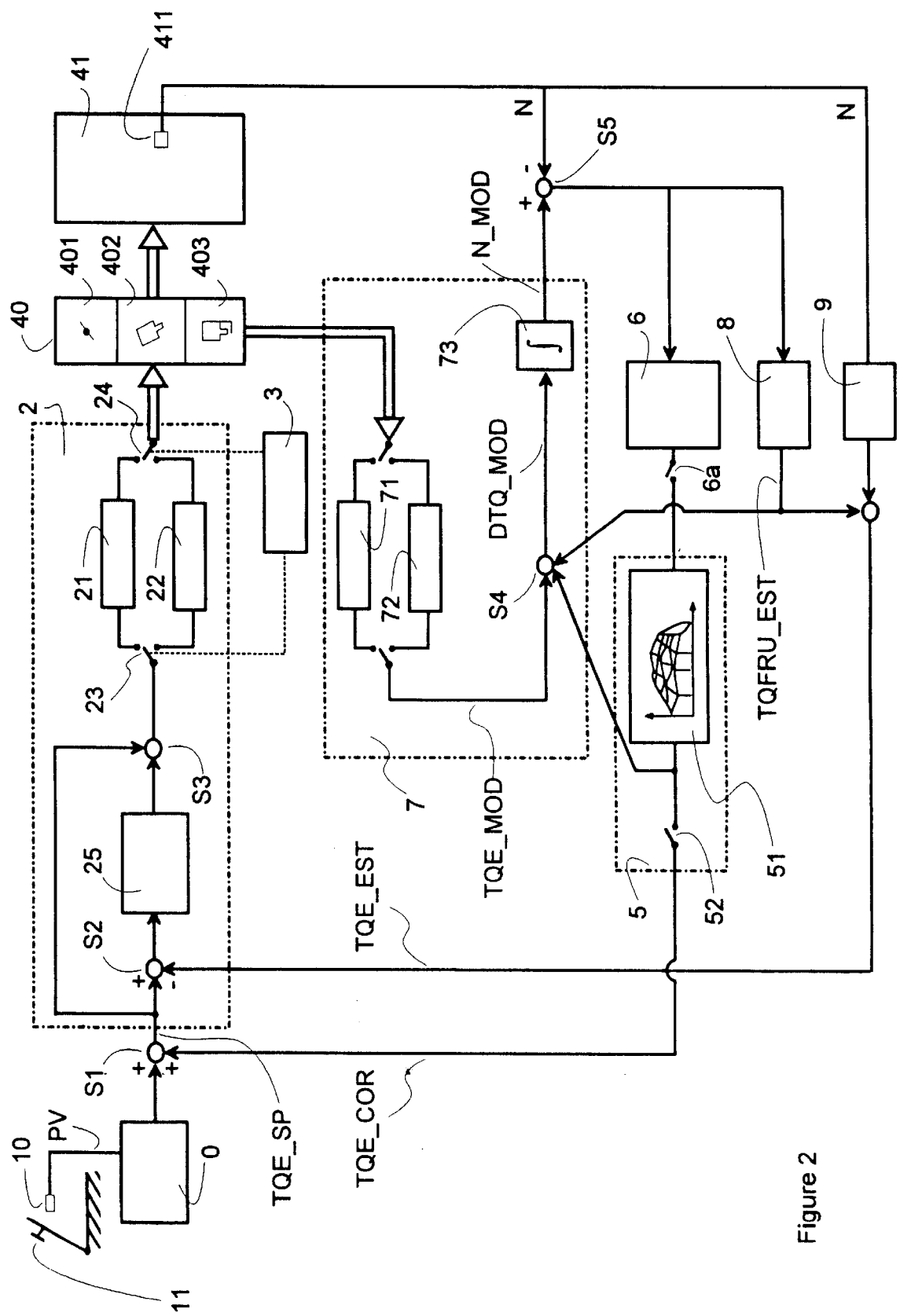

Other features and advantages of the control device according to the invention will become clear from reading the description which will follow and from examining the appended drawings, in which:

FIG. 1 depicts a control device for an internal combustion engine according to the invention, and FIG. 2 depicts a second embodiment or the control device according to the invention.

Elements of identical construction or which have the same function are denoted by the same reference on all the drawings.

FIG. 1 shows a control device according to the invention which comprises means 0 of determining a datum value TQE_SP for a transmission torque. A sensor 10 for sensing the position of an accelerator pedal 11 which measures the position PV of the accelerator pedal is connected to the determining means 0. The means 0 of determining the datum value of the transmission torque comprise a table in which the datum values for the transmission torque are recorded as a function at least of the position of the accelerator pedal. The transmission torque datum values can thus be stored in memory in the table as a function of other operating parameters such as, for example, the rotational speed N of the engine and/or the coolant temperature. It is also possible to anticipate correcting the transmission torque datum value as a function of additional loads, such as, for example, an alternator or an air-conditioning unit.

The datum value TQE_SP for the transmission torque is, corrected in a first summer S1 with a torque correction TQE_COR which is described later. The datum value TQE_SP for the transmission torque is transmitted to calculation means 2 which comprise a first inverse model 21 and a second inverse model 22 of the internal combustion engine. Such an inverse model preferably comprises a model of the filling of the inlet tract as described, for example, in document WO 96/32579, the content of which is also included here by reference. Furthermore, such an inverse model comprises a model of the combustion in the cylinders of the internal combustion engine. Using these first and second inverse models 21, 22, the datum values TQE_SP of the transmission torque can be associated with various commands for control means of a control unit 40 which takes account of the dynamics of the internal combustion engine inlet circuit. The values of the control commands are defined by engine test bed measurements.

The control unit 40 comprises control means, namely a throttle valve 401, at least one injector 402 and an ignition device 403. The control unit 40 may possibly comprise other control means such as automatic control of valve lift or an acoustic tuning device which varies the effective length of the inlet manifold. The control means act on the internal combustion engine 41 and control the torque it delivers. These control means may thus, by way of example, be effected by interrupting the injection during a changeover from stratified-charge combustion mode to homogeneous-charge combustion mode. These interruptions may be performed on one or more cylinders at a time during the period of time in which the flow of air entering the cylinder is greater than the desired air flow.

The control device is intended for an internal combustion engine 41 with high-pressure direct injection and controlled ignition. Into each cylinder of this type of internal combustion engine 41 there opens an injector 402 and a spark plug which forms part of the ignition device 403. It is thus possible, in an internal combustion engine of this type, to achieve either a homogeneous-charge combustion mode, that is to say a mode in which there is a uniform distribution of the fuel through the combustion chamber, or a stratified-charge combustion mode, that is to say a mode where there is only a localized high concentration of fuel, preferably near to the spark plug.

When the engine is operating at part load, the use of a stratified-charge combustion mode makes it possible to reduce the fuel consumption by what may be as much as 30% by comparison with an engine with indirect injection into the inlet tract operating in homogeneous-charge mode. This is because the throttle valve 401 is almost completely open and because of the reduction in associated pumping losses. Furthermore, reliable combustion is possible in stratified-charge operation even for small quantities of fuel when the fuel is locally stratified around the spark plug. The stratified charge is obtained by injecting very late in the compression stroke of the cylinder concerned. For operation with a stratified charge, the torque supplied by the internal combustion engine is controlled by controlling the mass of fuel injected during each cycle of the cylinder concerned.

In homogeneous-charge mode, the torque of the internal combustion engine is controlled by the mass of air let into the cylinder on each cycle. In homogeneous-charge operation, it is possible to have a maximum value of the excess air coefficient 1=1.5 for reliable combustion. For values 1>1.5, reliable combustion is no longer guaranteed.

Limitations such as problems with preparing the charge, driving comfort, and pollutant emissions governed by regulations prevent an internal combustion engine from being run with a stratified charge under all load conditions. As a result, at light and medium load, the internal combustion engine is operated in stratified-charge mode, whereas at high load and full load, it is operated with a homogeneous charge. Furthermore, the engine may possibly operate, temporarily alternating between stratified-charge and homogeneous-charge mode at light and medium load, to allow the regeneration of a catalytic converter in which the oxides of nitrogen are stored.

The change of combustion mode, from homogeneous charge to stratified charge and vice versa is controlled by a controller 3. The controller 3 determines whether the internal combustion engine needs to operate in stratified-charge mode or in homogeneous-charge mode, as a function of the load or the degree of saturation of the catalytic converter in which the oxides of nitrogen are stored.

The first inverse model 21 of the internal combustion engine represents the behavior of the internal combustion engine for operation with a homogeneous charge, whereas the second inverse model 22 represents the behavior of the internal combustion engine for operation with a stratified charge.

The controller 3 controls a first switch 23 so that the datum value TQE_SP of the transmission torque is transmitted to the first inverse model 21 when operating with a homogeneous charge, or to the second inverse model 22 when operating with a stratified charge. Likewise, the controller 3 controls a second switch 24 so that the output values from the first inverse model 21 are transmitted to the control means 40 when operating in homogeneous-charge mode, or so that the output values from the second inverse model 22 are transmitted to the means 40 when operating in stratified-charge mode.

The first and second inverse models 21, 22 calculate at least one control value for at least one control means. The datum value TQE_SP for the transmission torque is transmitted to the appropriate inverse model 21, 22.

The control device also comprises correction means 5 which correct the datum value TQE_SP of the transmission torque. The correction means 5 comprise a correction table 51 in which torque corrections TQE_COR are written as a function of at least one variable representing the engine load. The torque correction values TQE_COR are calculated from measurements made on engine test bed as a function of the values of variables representing the load on the engine. These variables representing the load on the engine may be the inlet pressure, a mass of air per inlet stroke of the cylinder, the rotational speed N and the extent to which the throttle valve 401 is open, an injection period or alternatively, a combination of these variables. By way of example, it is possible to use two-dimensional tables which can be addressed as a function of the inlet pressure and of the engine speed.

The correction means 5 also comprise a switch 52 which, in operation with stratified charge, connects the output of the correction table 51 to the first summer S1. In operation with homogeneous charge, the switch 52 is open. This is why the transmission torque datum value TQE_SP is not corrected with the engine torque correction value TQE_COR. As an alternative to the switch 52, it is also possible to provide a switching device which supplies the first summer S1 with an algebraic value of the torque correction TQE_COR, the sign of which is a function of the engine combustion mode.

Advantageously, the control device also comprises adaptation means 6 which comprise a delay element (not depicted) to which an output variable of the internal combustion engine 41 is transmitted. The difference between the current value of the output variable and the value supplied by the delay element is formed in the adaptation means 6, and integrating this difference provides an adaptation value with which, at a predetermined instant, for example after the change from homogeneous-charge combustion mode to stratified-charge combustion mode or vice versa, the torque correction value TQE_COR associated with the current value of the variable representing the load on the engine is adapted.

It is advantageous for the adaptation value to be calculated in a predetermined period of time around a change in combustion mode from homogeneous charge to stratified charge or around a change in combustion mode from stratified charge to homogeneous charge. In particular, at steady-state part load, when changing from homogeneous-charge combustion mode to stratified-charge combustion mode and vice versa, performed with a view to regenerating the catalyst, the output variable is a direct measure of the quality of the torque correction. By thus calculating, during this predetermined period of time, a value for adapting the torque correction for the corresponding load operating point of the internal combustion engine, variations due to the aging of the internal combustion engine and the production spread are taken into account. A switch 6a, which is closed during the adapting of a torque correction value TQE_COR, and which is open at other times, is associated with the adaptation means 6.

FIG. 2 shows a second exemplary embodiment of the control device according to the invention. The calculation means 2 comprise a regulator 25, the input variable of which is the difference, calculated by the summer S2, between the datum value TQE_SP and an estimated value TQE_EST of the transmission torque. The calculating of the estimated value TQE_EST of the transmission torque is described later. The regulator 25 may be a proportional, integral and derivative regulator, but may also be a regulator of some other type, for example a non linear regulator.

In a third summer S3, the output signal from the regulator 25 is added to the datum value TQE_SP of the transmission torque and supplied to the first inverse model 21 or to the second inverse model 22, depending on the position of the first switch 23. Depending on the position of the first and of the second switches 23, 24, it is either the first inverse model 21 or the second inverse model 22 which calculates the commands for the control means of the control unit 40.

The commands for the control means are transmitted to an observer 7. Alternatively, measured values of the controls performed, obtained for example by a position sensor on the throttle valve 401, are transmitted to the observer. The observer 7 has a first model 71 and a second model 72 of the internal combustion engine. The first and second models 71, 72 are respectively the inverse of the first and second inverse models 21, 22. The first model 71 and the second model 72 respectively calculate an observed value TQE_MOD of the transmission torque. The command control values are thus converted into an observed value TQE_MOD of the transmission torque by the first model 71, when combustion is in homogeneous-charge mode, or by the second model 72, when combustion is in stratified-charge mode. As seen earlier in conjunction with the inverse models 21 and 22, switches, not depicted, are provided on the input and output of the first and second models 71, 72 and activate the first and second models 71, 72 as a function of the command signals from the controller 3.

The torque correction TQE_COR originating from the correction means 5 and an estimated value TQFRU_EST of an additional resistive torque such as, for example, the resistive torque generated by a variation in the profile of the road or by the wind are subtracted from the observed transmission torque value TQE_MOD in a summer S4. An observed value DTQ_MOD of a torque available for acceleration is therefore obtained at the output of the summer S4. The observed value DTQ_MOD of the torque available for acceleration is integrated in an integrator 73 and divided by a predetermined value J of a moment of inertia of the vehicle. The predetermined value J of the moment of inertia is stored in a memory or may be calculated as a function of signals from sensors that sense the occupancy of the seats or the presence of a trailer. The output variable from the integrator is the observed rotational speed N_MOD.

A sensor 411 that senses the rotational speed measuring the rotational speed N of a crankshaft of the internal combustion engine 41 is associated with the control device according to the invention. The rotational speed N represents the output variable of the internal combustion engine 41. The internal combustion engine output variable, in another embodiment of the control device, may also be a pressure in the combustion chamber or a torque measured on the output shaft of the internal combustion engine.

In a fifth summer S5, the difference between the observed rotational speed N_MOD and the rotational speed N is formed and transmitted to the adaptation means 6. This difference is integrated by the adaptation means 6, preferably during the predetermined period of time around a change in combustion mode from homogeneous charge to stratified charge or vice versa. At the end of the predetermined period of time, the sum of the integral at the output of the adaptation means 6 and the value TQE_COR of the torque correction for the actual current load conditions is stored in memory as a new torque correction value TQE_COR in the correction table 51. For this purpose, there is a switch 6a which, depending on its position, which is controlled by the controller 3, connects or does not connect the adaptation means 6 to the correction means 5.

The difference between the observed rotational speed N_MOD and the rotational speed N is also transmitted to first estimating means 8 which, outside of the predetermined period of time, calculate an estimated value TQFRU_EST of an additional resistive torque from a proportional, integral and derivative fraction of the input variable. The estimated value of the additional resistive torque TQFRU_EST represents, as was seen earlier, an estimate of the losses due, for example, to atmospheric friction or to an error when modeling the losses of the internal combustion engine. The estimated value TQFRU_EST must preferably remain constant during the predetermined period of time.

Second estimating means 9 calculate an estimated value TQE_EST of the transmission torque as a function of the rotational speed N and of the estimated value TQFRU_EST of the additional resistive torque. The second estimating means 9 comprise a differentiator which calculates the derivative of the rotational speed N and therefore an estimated value of the acceleration of the vehicle. This estimated value of the acceleration is then multiplied by the predetermined value J of the moment of inertia of the vehicle thus giving an estimated value for an acceleration torque which is added to the estimated value TQFRU_EST of the additional resistive torque in order to obtain an estimated value TQE_EST of the transmission torque.

What is claimed is:

1. A device for controlling a controlled-ignition direct-injection internal combustion engine, comprising:
   a determinator for determining a reference value of a transmission torque as a function of a position of an accelerator pedal;
   a calculator for calculating a value of at least one command of at least one controller for controlling the engine based on a datum value for a transmission torque, said calculator having:
     a first inverse model of the engine in a homogeneous-charge combustion mode; and
     a second inverse model of the engine in a stratified-charge combustion mode; and
   a corrector configured to correct the datum value of the transmission torque as a function of the engine combustion mode by applying a torque correction taken from a correction table as a function of at least one variable representing a load on the engine.

2. The control device according to claim 1, including an adaptor for adapting the torque corrections in the correction table as a function of an engine output variable.

3. The control device according to claim 2, wherein the adapting is performed in a predetermined period of time around a change in combustion mode from homogeneous charge to stratified charge and vice versa.

4. The control device according to claim 3, including an observer to supply an observed value of the engine output variable as a function of at least one command for controlling the engine, said adaptor performing the adaptation as a function of a combination of an observed value and of a measured value of the output variable.

5. The control device according to claim 4, including an estimator which, outside a predetermined period of time around a change in combustion mode, produces an estimated value of an additional resistive torque as a function of a combination of the observed value and of the measured value of the output variable.

6. The control device according to claim 5, wherein the combination is a difference between the observed and the measured value of the output variable.

7. The control device according to claim 2, wherein the output variable is a rotational speed of the engine.

8. The control device according to claim 5, wherein said estimator produces an estimated value of the transmission torque based on the engine speed and the estimated value of the additional resistive torque.

9. The control device according to claim 5, wherein said observer supplies an observed value of the engine output variable which is also a function of the estimated value of the additional resistive torque.

10. The control device according to claim 5, wherein the combination is a difference between the observed and the measured value of the output variable.

11. The control device according to claim 8, wherein said calculator has a regulator with an input variable being a difference between the datum value and the estimated value of the transmission torque.

* * * * *